(No Model.)

A. M. IRBY.
BICYCLE STEP.

No. 586,335. Patented July 13, 1897.

WITNESSES
Edmund H. Strause.
W. M. Mason

INVENTOR,
Addie M. Irby.
by John Wedderburn
Attorney

UNITED STATES PATENT OFFICE.

ADDIE M. IRBY, OF VERNON HILL, VIRGINIA.

BICYCLE-STEP.

SPECIFICATION forming part of Letters Patent No. 586,335, dated July 13, 1897.

Application filed August 4, 1896. Serial No. 601,617. (No model.)

*To all whom it may concern:*

Be it known that I, ADDIE M. IRBY, a citizen of the United States, residing at Vernon Hill, in the county of Halifax and State of Virginia, have invented certain new and useful Improvements in Bicycle-Steps; and I do hereby declare the following to be a full, clear, and exact description of the invention, such as will enable others skilled in the art to which it appertains to make and use the same.

The mounting-step now in general use on bicycles usually consists of an extension of the rear axle or of a lug or projection attached to the lower end of the rear fork. This form of step is objectionable for the reason that in mounting the bicycle quickly the heel of the foot is apt to be brought into contact with the spokes of the rear wheel, either breaking or bending said spoke or throwing the foot from the step, causing a disagreeable fall to the rider. The object of my invention is to overcome this objection and to so construct the step of the bicycle that it is impossible for the heel of the foot to come in contact with the spokes of the rear wheel.

The invention consists of a step adapted to be attached to the rear of the bicycle-frame, having an upwardly, outwardly, and rearwardly curved arm constituting a heel-guard secured thereto or formed integral therewith.

The invention is clearly illustrated in the accompanying drawings, in which—

Figure 1:
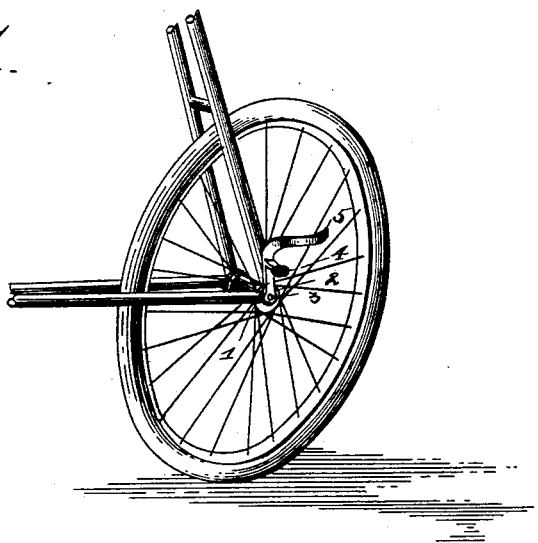
Figure 2:
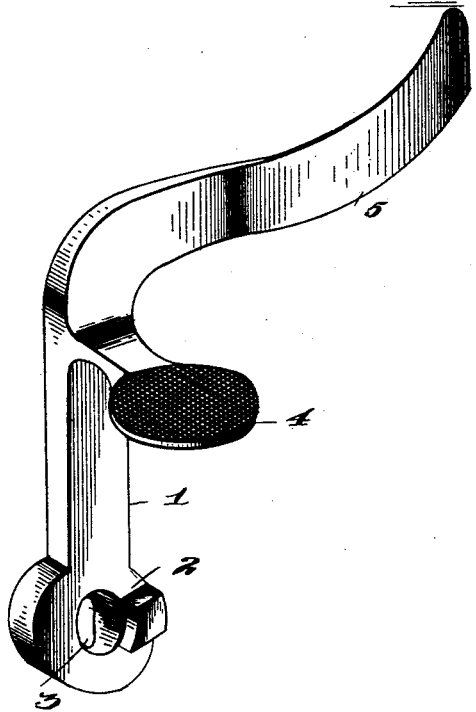

Figure 1 represents a perspective view of a bicycle having my improved step applied thereto. Fig. 2 is a similar view of the step detached.

Like reference-numerals indicate like parts in the two views.

My improved step is made up of an upright portion 1, having a boss 2 at its lower end, which has an opening 3 therein, adapted to embrace the extension of the rear axle, the step proper, 4, having a milled or roughened upper surface extending outwardly from the upright 1. An upwardly, outwardly, and rearwardly extending curved arm 5 is connected to the upper end of the upright 1 and constitutes a heel-guard for preventing the heel of the foot of the rider from coming in contact with the rear spokes of the wheel in the act of mounting the wheel.

The invention is extremely simple in construction, can be cheaply made, and applied to any bicycle now in use.

Having now described my invention, what I claim as new, and desire to secure by Letters Patent, is—

1. A step for a bicycle adapted to be secured to the frame thereof adjacent to the axle of the rear wheel and having a heel-guard secured to or formed integral with it, the said heel-guard extending rearwardly from the step proper.

2. The combination with a bicycle, of a mounting-step therefor, the same having an upwardly and rearwardly extending arm constituting a heel-guard, secured to or formed integral therewith.

In testimony whereof I have signed this specification in the presence of two subscribing witnesses.

ADDIE M. IRBY.

Witnesses:
W. C. MILLS,
C. M. RIDDLE.